United States Patent
McGhie et al.

(10) Patent No.: US 7,216,896 B1
(45) Date of Patent: May 15, 2007

(54) HEAVY HAULING SYSTEM WITH HYDRAULIC-POWERED EXTENDABLE AXLES

(75) Inventors: James R. McGhie, Henderson, NV (US); Robb I. McGhie, Las Vegas, NV (US)

(73) Assignee: Robb Technologies, LLC, Las Vegas, NV (US)

( * ) Notice: Subject to any disclaimer, the term of this patent is extended or adjusted under 35 U.S.C. 154(b) by 0 days.

(21) Appl. No.: 11/292,194

(22) Filed: Dec. 1, 2005

Related U.S. Application Data

(63) Continuation of application No. 11/269,491, filed on Nov. 7, 2005, now abandoned.

(60) Provisional application No. 60/626,015, filed on Nov. 8, 2004.

(51) Int. Cl.
 *B62D 63/06* (2006.01)
(52) U.S. Cl. .................... 280/789; 180/22; 180/209; 280/405.1; 280/638; 280/656
(58) Field of Classification Search ................ 280/789, 280/781, 405.1, 638, 35, 656; 180/21, 22, 180/24.02, 209
See application file for complete search history.

(56) References Cited

U.S. PATENT DOCUMENTS

| | | | | |
|---|---|---|---|---|
| 2,681,231 A | * | 6/1954 | Kondracki | 180/9.48 |
| 3,330,574 A | * | 7/1967 | Kulyk | 280/656 |
| 3,430,791 A | * | 3/1969 | Moss | 414/474 |
| 4,350,222 A | * | 9/1982 | Lutteke et al. | 180/209 |
| 4,441,730 A | | 4/1984 | Damm | |
| 4,468,047 A | | 8/1984 | McGhie | |
| 4,943,078 A | | 7/1990 | McGhie | |
| 5,005,851 A | | 4/1991 | McGhie | |
| 5,039,129 A | * | 8/1991 | Balmer | 180/308 |
| 5,112,073 A | | 5/1992 | McGhie | |
| 5,401,050 A | * | 3/1995 | Baker | 280/656 |
| 5,419,577 A | * | 5/1995 | Murray | 280/656 |
| 6,796,572 B1 | | 9/2004 | McGhie | |
| 6,942,232 B1 | | 9/2005 | McGhie | |

* cited by examiner

*Primary Examiner*—Eric Culbreth
(74) *Attorney, Agent, or Firm*—Shimokaji & Associates, P.C.

(57) ABSTRACT

A carriage for transporting heavy loads on conventional roads is disclosed. The carriage comprises a central beam extending the length of the carriage and a plurality of cross beams. At least one of the plurality of cross beams comprises a hollow element having a first end and a second end, wherein the hollow element is coupled to and extends perpendicularly to the central beam; a first beam slidably positioned within the first end of the hollow element, wherein the first beam is coupled to at least one axle; and a second beam slidably positioned within the second end of the hollow element, wherein the second beam is coupled to at least one axle. The carriage further comprises a hydraulic system coupled to each of the plurality of cross beams for hydraulically sliding each beam positioned within each hollow element.

21 Claims, 5 Drawing Sheets

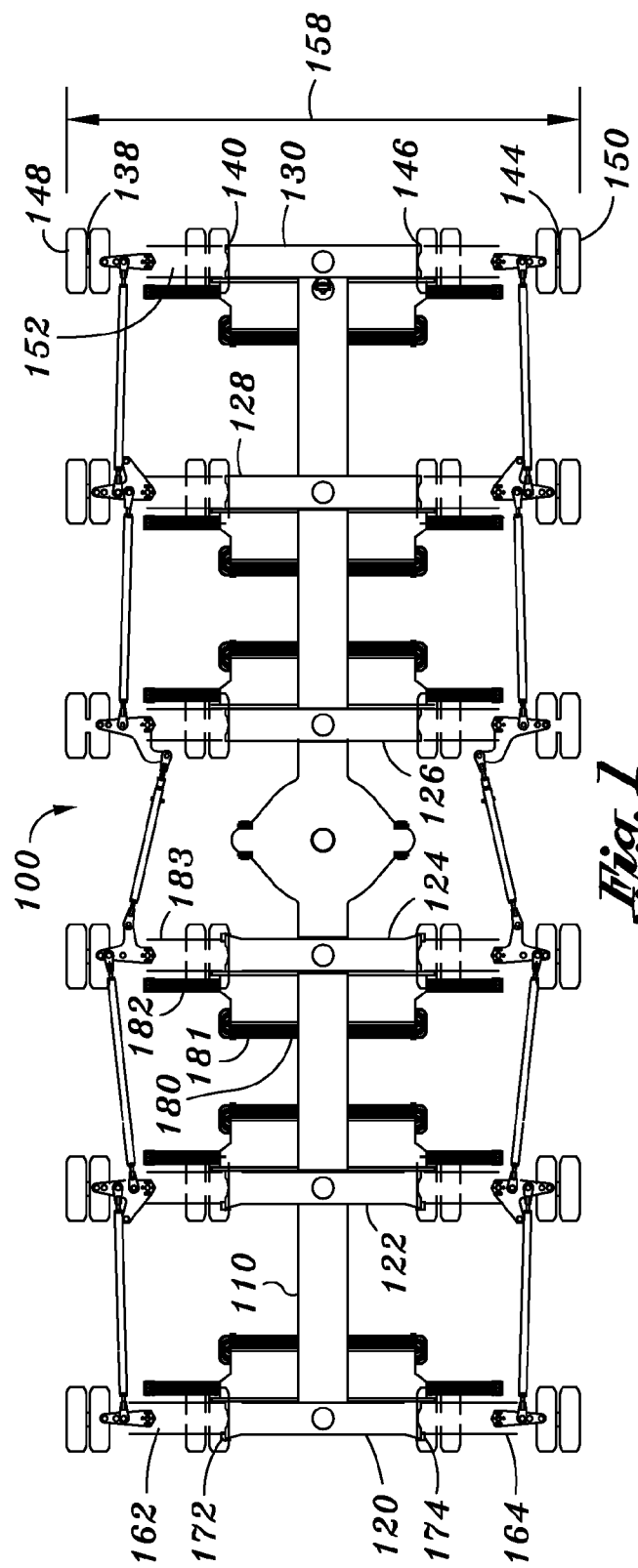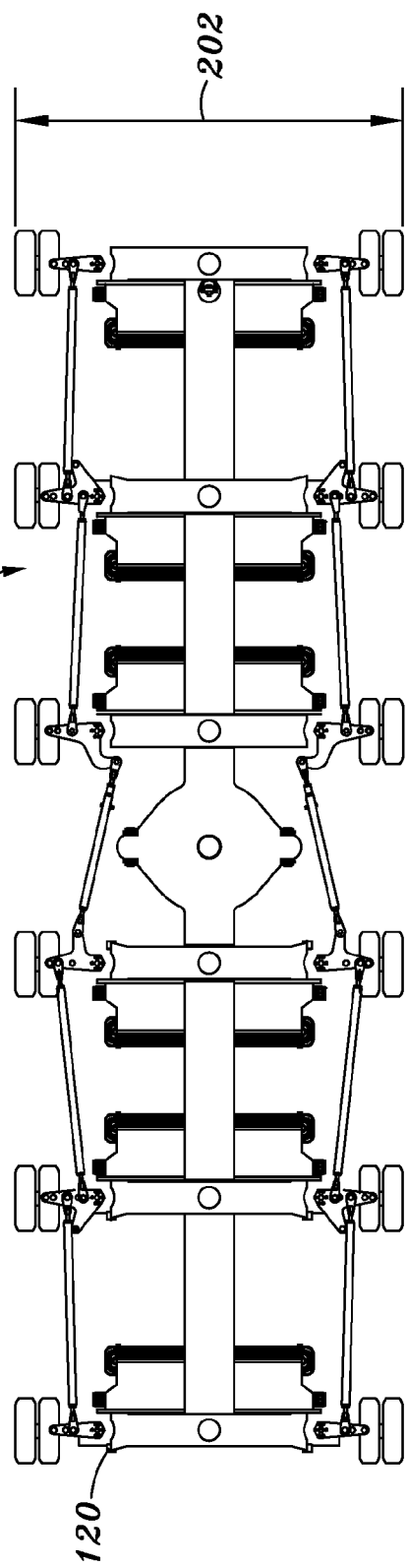

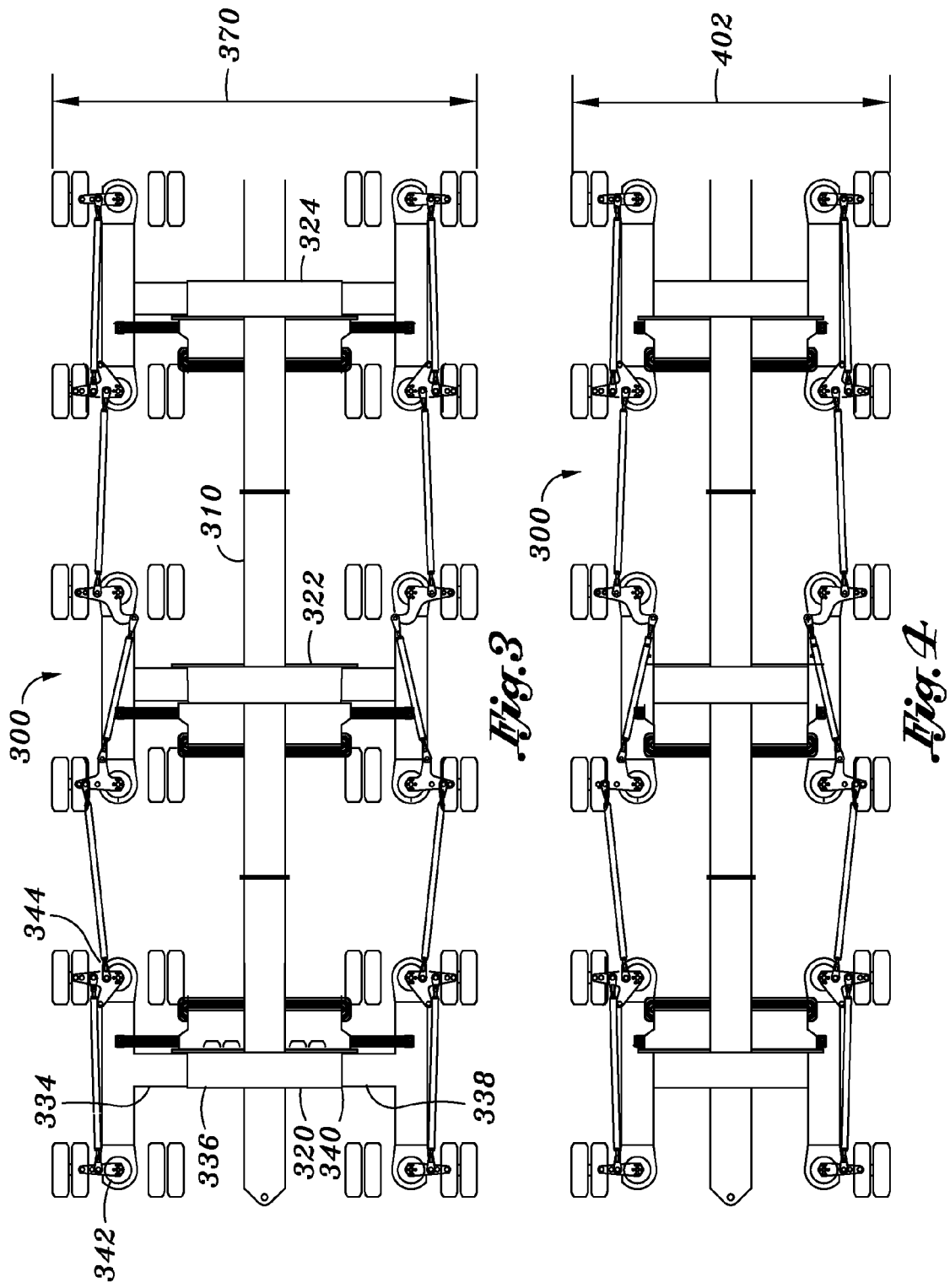

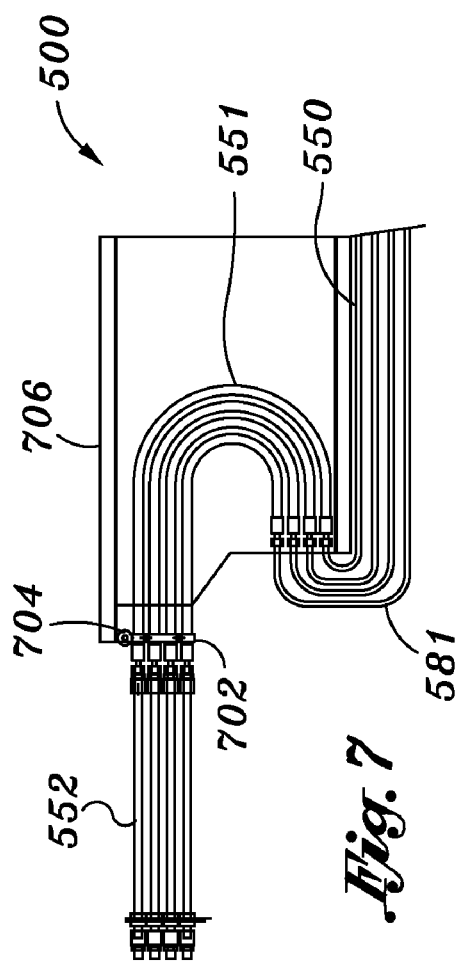
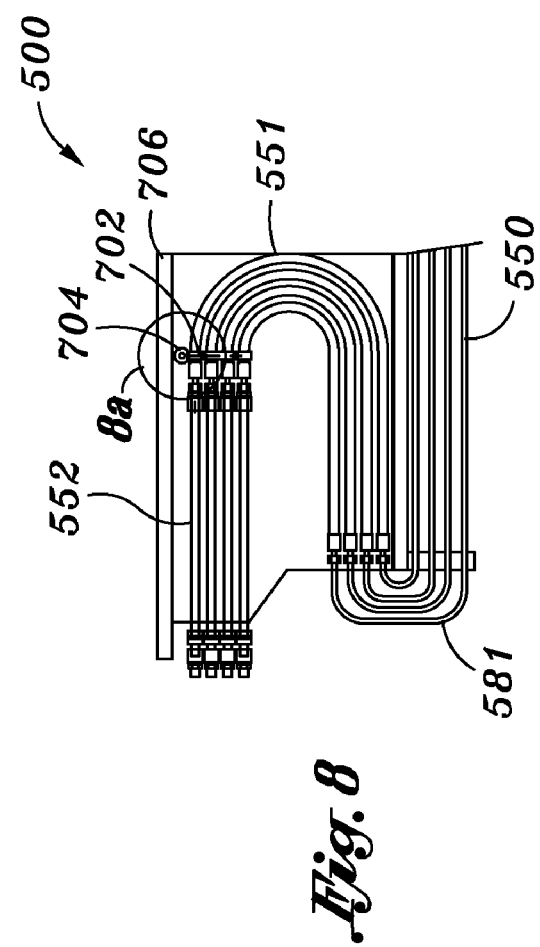
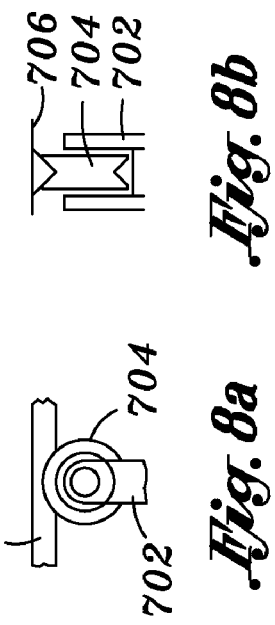

HEAVY HAULING SYSTEM WITH HYDRAULIC-POWERED EXTENDABLE AXLES

CROSS-REFERENCE TO RELATED APPLICATIONS

This is a continuation of U.S. patent application Ser. No. 11/269,491, filed on Nov. 7, 2005, now abandoned, which claims benefit of U.S. provisional patent application No. 60/626,015, filed on Nov. 8, 2004 both of which are hereby incorporated by reference in their entirety.

BACKGROUND OF THE INVENTION

The present invention relates generally to multi-axle, heavy-load transport haulers that operate at high speed over standard highways. Heavy-load transport haulers are used to transport heavy or massive loads such as construction equipment, construction materials, massive vehicles or the like. The use of heavy-load transport vehicles, however, can be accompanied by problems.

Certain states have regulations pertaining to hauling of heavy loads and restricting vehicle width. For example, certain states have regulations requiring a heavy-load vehicle to obtain a permit from a state's bridge department and use a highway patrol escort before traveling to and from a jobsite unladen with a vehicle having a width greater than fifteen feet. In addition, if the heavy load vehicle is designed to be reduced, i.e., to be taken apart and hauled by conventional means in its unladen condition, the applicable department(s) of transportation will require that the system be reduced and transported in this manner. This can be costly and time consuming: (1) in the retention of highway patrol, as highway patrol must be hired and the process for obtaining a permit can take several weeks; and (2) the heavy load vehicle must be assembled and disassembled when traveling to and from the jobsite to haul a load and/or loads. Having a non-reducible unladen vehicle having a width of fifteen feet or less, however, requires only a single trip permit that is simpler and faster to obtain and typically does not require the involvement of state highway patrol. In addition, due to a lack of reducibility, the vehicle is not required to be disassembled when traveling to and from the jobsite unladen.

Vehicle width requirements for heavy-load vehicles can also be an obstacle at a work site. Whereas a heavy-load vehicle may have clearance for transport over a public highway or road, sometimes space requirements are restricted on work sites such as a construction site. As construction progresses at a work site, the amount of space available for vehicles decreases. As a result, work spaces for vehicles can become cramped at these work sites. In addition, places such as refineries have limited space as designed and constructed. Consequently, heavy-load vehicles must maneuver or simply unload in unwanted positions or locations at a work site or delivery location, and at times items must be unloaded from the vehicles and placed on off-highway platform trailers or roller type systems and taken to a specific location on the jobsite.

Maneuverability can also be a problem with heavy-load vehicles. Heavy-load vehicles include many (typically from 6–10) axles, all of which may not offer steering capability. The lack of steering capability at all axles of heavy-load multi-axle vehicles greatly compromises the ability of the vehicle to maneuver and negotiate obstacles such as tight turns. Of those multi-axle heavy-load vehicles that offer power-steering capability at all axles, it can be difficult to regulate power steering forces at high speeds and in longer configurations. Too much steering power can introduce other ancillary vehicle problems, such as road sway during use.

As can be seen, there is a need for an improved multi-axle heavy-load vehicle that overcomes the problems with vehicle width restrictions, while not being considered a reducible load by a jurisdiction. Moreover, there is a need for an improved multi-axle heavy-load vehicle that overcomes the problems with steering sensitivity at highway speeds and in longer vehicle lengths in both the laden and unladen conditions.

SUMMARY OF THE INVENTION

In one aspect of the present invention, a carriage for transporting heavy loads on conventional roads is disclosed. The carriage comprises a central beam extending the length of the carriage and a plurality of cross beams. At least one of the plurality of cross beams comprises a hollow element having a first end and a second end, wherein the hollow element is coupled to and extends perpendicularly to the central beam; a first beam slidably positioned within the first end of the hollow element, wherein the first beam is coupled to at least one axle; and a second beam slidably positioned within the second end of the hollow element, wherein the second beam is coupled to at least one axle. The carriage further comprises a hydraulic system coupled to each of the plurality of cross beams for hydraulically sliding each beam positioned within each hollow element.

In another aspect of the present invention, a trailer for use on conventional roads is disclosed. The trailer comprises at least one carriage, wherein each carriage comprises a central beam extending the length of the at least one carriage. The carriage further comprises a plurality of hollow cross beams coupled perpendicularly to the central beam, wherein each cross beam comprises at least one slidable beam positioned within the cross beam, wherein the at least one slidable beam is coupled to at least one axle. The carriage further comprises a hydraulic system coupled to each of the plurality of cross beams for hydraulically sliding the at least one slidable beam positioned within each cross beam.

In still another aspect of the present invention, a vehicle for transporting loads on conventional roads is disclosed. The vehicle comprises a truck for providing locomotion and a trailer coupled to the truck via connecting means, the trailer comprising at least one carriage. The at least one carriage comprises a central beam extending the length of the carriage; a plurality of rectangular-shaped slidable beams coupled perpendicularly to the central beam, wherein each slidable beam is coupled to at least one axle; and a hydraulic system coupled to each of the plurality of slidable beams for hydraulically sliding each slidable beam so as to vary the width of the carriage.

These and other features, aspects and advantages of the present invention will become better understood with reference to the following drawings, description and claims.

BRIEF DESCRIPTION OF THE DRAWINGS

FIG. 1 is a top view of a heavy hauling system in extended mode according to one embodiment of the present invention.

FIG. 2 is a top view of the hauling system in retracted mode according to the embodiment of the present invention shown in FIG. 1.

FIG. 3 is a top view of a hauling system for a dual axle carriage in extended mode according to one embodiment of the present invention.

FIG. 4 is a top view of the hauling system for a dual axle carriage in retracted mode according to the embodiment of the present invention shown in FIG. 3.

FIG. 7 is a top view of the hydraulic system 500 for a carriage in extended mode according to one embodiment of the present invention.

FIG. 8 is a top view of the hydraulic system 500 for a carriage in retracted mode according to the embodiment of the present invention shown in FIG. 8.

FIG. 8A shows a side view close up of a travel roller assembly according to one embodiment of the present invention.

FIG. 8B shows a side view close up of the travel roller assembly according to the embodiment of the present invention shown in FIG. 8A.

DETAILED DESCRIPTION OF THE INVENTION

Figure 5:
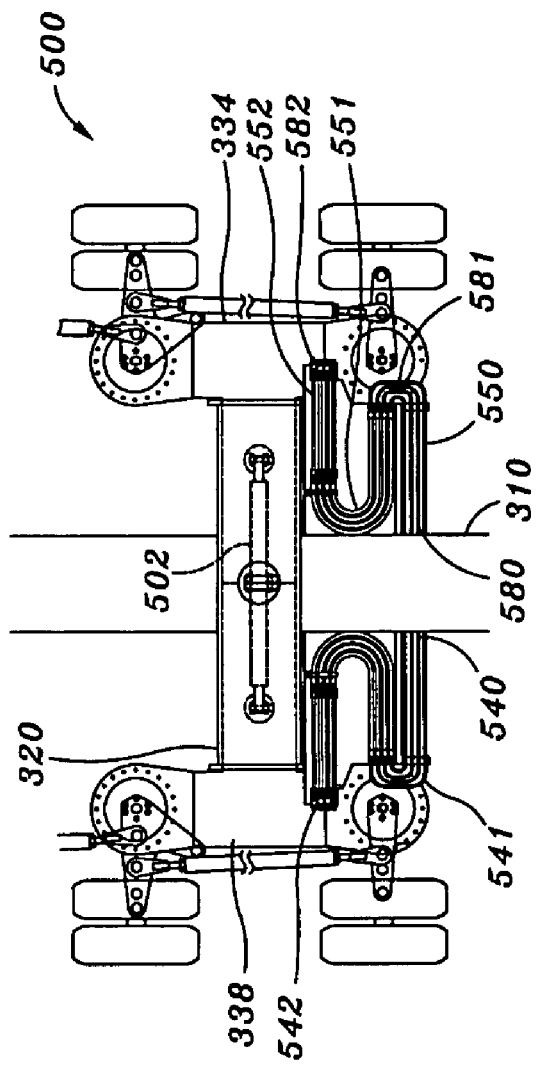
FIG. 5 is a top view of a hydraulic system for a carriage in retracted mode according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an improved multi-axle heavy-load vehicle for hauling heavy loads over conventional roads. The multi-axle heavy-load vehicle of the present invention includes a trailer having at least one carriage including hydraulic-powered, sliding axles that vary the width of the carriage significantly (such as over five feet). The sliding axles can be hydraulically extended out from the central beam of the carriage to make the carriage wider or retracted towards the central beam to make it narrower depending on highway and/or job-site limitations. Further, the sliding axles can be extended or retracted while the carriage is loaded, unladen, or stationary. This is advantageous as it allows for the width of a heavy-load vehicle to vary so as to comply with regulatory width and heavy-hauling restrictions. This is further advantageous as it allows for a heavy-load vehicle to adjust its width to accommodate work site restrictions on space. The axle extension and retraction can occur hydraulically while the vehicle is laden or unladen, thereby requiring minimal intervention by a human operator and nominal quantities of time. This is done in unison such that at any point in the extension all the axles are perfectly in line along the length of the trailer. This allows for the mechanical steering rods, which provide vehicle steering, to remain connected during extension and retraction. When the retraction and/or retraction ceases, the axle beams are automatically hydraulically checked (locked) to ensure zero movement.

The heavy hauling system according to one embodiment of the present invention can travel to and from the job-site unladen at a retracted width (of, for example, fifteen feet) without having to remove cross beams or axles from the carriage. The only portion of the system that must be hauled separately would be center sections of an extendable drop beam system or other type of load support member (bed and gooseneck, standard beams, etc.). The heavy hauling system according to one embodiment of the present invention has the ability to uniformly hydraulically retract in from an extended width (of, for example, twenty feet) to varying widths in the loaded condition and the ability to hydraulically lengthen or shorten the carriages depending on the item being hauled and depending on job-site space-related limitations. The carriage beams are automatically hydraulically checked (locked) to ensure zero movement upon completion of uniform extension and/or retraction.

The heavy hauling system according to one embodiment of the present invention allows for highway-friendly transportation of large loads to the job-site; has the ability to retract and/or extend the system uniformly while loaded and unloaded; and allows for quick unladen "empty" transport of the heavy hauling system to and from the job site without having to disassemble any portion of the carriages of the system. Specifically, the heavy hauling system includes carriages that need not be reduced once heavy transport is completed. In other words, by being able to significantly hydraulically retract width, all carriages can be driven back to the depot without having to remove cross beams, axles or other components. The heavy hauling system has the ability to haul in various lines of cross beams (6, 8, 10, etc.) either with a load support system (bed and gooseneck, standard beams, extendable drop beams, etc.) or individually as platform trailers depending on load and bridge-related restrictions and the ability to convert each carriage to platform trailers to diversify hauling options, and multiple suspension related configurations (1 point, 2 point, 3 point, 4 point, etc.) for more efficient hauling, loading, and removal options.

The heavy hauling system according to one embodiment of the present invention allows for the avoidance of regulations requiring a heavy-load vehicle to obtain a permit from a state's bridge department and use a highway patrol escort to and from the jobsite in the unladen condition on a vehicle having a width greater than fifteen feet. In addition, due to the vehicle's lack of reducibility, it does not need to be disassembled when traveling to and from the jobsite unladen. By retracting the carriage width to fifteen feet, the system of the present invention requires only a single trip permit that is simpler and faster to obtain and typically does not have require the involvement of state highway patrol.

Conventional heavy hauling systems do not have the combined ability to: (1) hydraulically extend and retract the overall carriage system width in either the loaded or unloaded conditions; (2) change in a longitudinal sense via the use of modular carriage extensions to allow for 6 line, 8 line, or 10 line carriages; and (3) have the ability to convert to platform trailers that can travel safely at highway speeds of 55 mph.

FIG. 1 is a top view of a heavy hauling system 100 in extended mode according to one embodiment of the present invention. The heavy hauling system 100 shows the framework for a carriage that may be towed by a truck or tractor that pulls or tows the carriage, wherein one or more carriages comprise a trailer, using connecting means such as a tow bar or fifth wheel. The heavy hauling system 100 can comprise a central beam, or spine, 110, and a plurality of cross beams, 120, 122, 124, 126, 128, 130, that may be substantially evenly spaced and coupled to the central beam 110 at the center point of each cross beam, wherein each cross beam may extend perpendicularly from the center beam 110. Although FIG. 1 shows only six cross beams, the present invention supports any viable number of cross beams. Coupled to the end of each cross beam may be a single axle comprising a shaft with a set of wheels on each end. For example, cross beam 130 includes a first single axle 138 coupled to end 140 of the cross beam 130 and a second single axle 144 coupled to end 146 of the cross beam 130. Axle 138 includes a shaft 152 having a set of wheels 148 and 150 coupled to each end of the shaft 152.

Central beam 110 may include removable portions such that a user is given the ability to shorten or lengthen the carriage as desired or required. Removable cross beams may also be utilized in order to modify the number of cross beams along the carriage as needed. For example, the present invention may use six, eight, ten, twelve, fourteen, sixteen or eighteen cross beams. Furthermore, additional cross beam portions and additional central beam portions can be attached to the central beam 110 to lengthen the carriage and/or add additional axles. These cross beam portions and central beam portions may be removable portions in order to shorten or lengthen the carriage as desired or required.

Each cross beam may comprise a hollow portion that may be, for example, rectangular shaped. Within each hollow end of a cross beam may be a slidable beam, such as slidable beams 162 and 164 that may be positioned within end 172 and end 174, respectively of cross beam 120. Slidable beams may be, for example, rectangular shaped with dimensions somewhat smaller than the dimensions of the hollow portion of the cross beam in which it sits. Each slidable beam can slide within the hollow portion of a cross beam. The slidable beams of FIG. 1 are shown all to be extended, such that the width 158 of the carriage is, for example, twenty feet.

The heavy hauling system 100 of the present invention further includes a hydraulic system coupled to each of the plurality of slidable beams for hydraulically sliding each slidable beam positioned within each hollow element of a cross beam. In one embodiment of the present invention, the hydraulic system further comprises a hydraulic cylinder (not shown) positioned within each cross beam for hydraulically sliding each slidable beam away from or towards the central beam 110. FIG. 1 shows a hydraulic line 181 coupled to the central beam 110 at 180 and coupled at 182 to the slidable beam 183 in cross beam 124. The hydraulic line 181 extends or contracts when the slidable beam 183 slides within the hollow element of cross beam 124. The hydraulic system slides each slidable beam away from and towards the central beam 110 in unison, when activated, such that the width of the carriage is uniform across all cross beams during and after extension or retraction of the slidable beams. Further, in another embodiment of the present invention, the hydraulic system further comprises a check valve for preventing sliding of each slidable beam positioned within each hollow element of a cross beam. The check valve eliminates the need for a mechanical pinning apparatus used to restrict movement of the slidable beams when the slidable beams have reached their desired width, after extension or retraction, and it is desired that the slidable beams maintain the desired width during operation.

FIG. 2 is a top view of the hauling system 100 in retracted mode according to the embodiment of the present invention shown in FIG. 1. The slidable beams of FIG. 2 are shown all to be retracted, such that the width 202 of the carriage is, for example, fifteen feet.

FIG. 3 is a top view of a hauling system 300 for a dual axle carriage in extended mode according to one embodiment of the present invention. FIG. 3 shows a carriage comprising a central beam 310 and three cross beams, 320, 322, 324, that may be substantially evenly spaced and coupled to the central beam 310 at the center point of each cross beam, wherein each cross beam may extend perpendicularly from the center beam 310. Coupled to the end of each cross beam may be a T-beam wherein one end of the T-beam may be inserted into an end of a cross beam and the two remaining ends of the T-beam may be coupled to a single axle comprising a shaft with a set of wheels on each end. For example, cross beam 320 can include T-beam 334 inserted into one end 336 of the cross beam 320 and T-beam 338 inserted into the other end 340. T-beam 334 can include a single axle 342 attached to one end of the T-beam 334 and a single axle 344 attached to the other end.

Each cross beam may comprise a hollow portion that may be, for example, rectangular shaped. Within each hollow end of a cross beam may be a slidable T-beam, such as slidable T-beams 334 and 338 that may be positioned within end 336 and end 340, respectively, of cross beam 320. Cross sections of slidable T-beams may be, for example, rectangular shaped with dimensions somewhat smaller than the dimensions of the hollow portion of the cross beam in which it sits. Each slidable T-beam can slide within the hollow portion of a cross beam. The slidable beams of FIG. 3 are shown all to be extended, such that the width 370 of the carriage is, for example, twenty feet.

FIG. 4 is a top view of the hauling system 300 for a dual axle carriage in retracted mode according to the embodiment of the present invention shown in FIG. 3. The slidable beams of FIG. 4 are shown all to be retracted, such that the width 402 of the carriage is, for example, fifteen feet.

FIG. 5 is a top view of a hydraulic system 500 for a carriage in retracted mode according to one embodiment of the present invention. FIG. 5 shows more detail of cross beam 320 of FIG. 3. The hydraulic system 500 is coupled to the slidable T-beams 334, 338 of cross beam 320 for hydraulically sliding each slidable beam away from or towards the central beam 310. The hydraulic system 500 includes a hydraulic cylinder 502 positioned within cross beam 320 for hydraulically sliding each slidable T-beam 334, 338. FIG. 5 further shows a hydraulic line 581 coupled to the central beam 310 at 580 and coupled at 582 to the slidable T-beam 334 in cross beam 320. FIG. 5 further shows a hydraulic line 541 coupled to the central beam 310 at 540 and coupled at 542 to the slidable T-beam 338 in cross beam 320.

It is shown that each hydraulic line comprises three portions, a solid portion, a flexible portion and another solid portion. For example, hydraulic line 581 comprises a solid portion 550, a flexible portion 551 and another solid portion 552. The solid portions 550, 552 may comprise solid tubing such as steel tubing while flexible portions, such as portion 551, may comprise flexible tubing such as rubber or the like.

Hydraulic cylinder 502 is used to hydraulically slide slidable T-beams 334, 338 using the expansion and retraction capabilities of the cylinder. Cylinder 502 is located within cross beam 320 such that the cylinder 502 extends in the same direction as a cross beam 320. One end of the cylinder 502 is coupled with slidable T-beam 334 and the other end of the cylinder 502 is coupled with slidable T-beam 338. The hydraulic line 581 extends or contracts when the slidable beam 334 slides within the cross beam 320. The hydraulic system 500 slides each slidable beam 334, 338 away from and towards the central beam 310 in unison, when activated, such that the width of the carriage is uniform across all cross beams during and after extension or retraction of the slidable beams.

In one embodiment of the present invention, the hydraulic lines 541, 581 of the hydraulic system 500 are further utilized to provide hydraulic suspension and air braking capabilities to axle assemblies. For example, hydraulic line 581 may be utilized to provide hydraulic suspension and air braking capabilities to axle assemblies 590 and 591 coupled to slidable T-beam 334.

Figure 6:
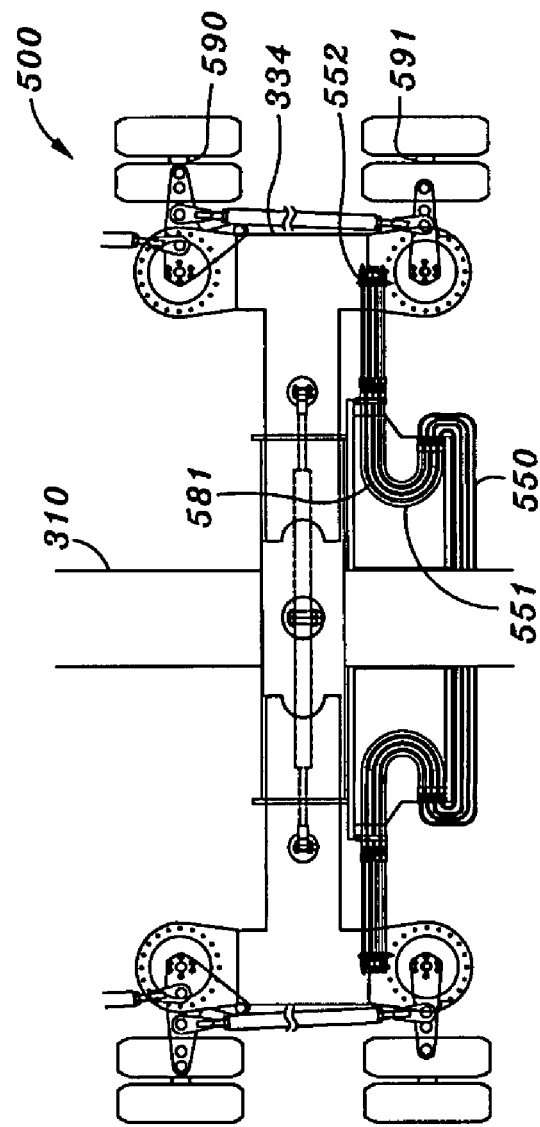
FIG. 6 is a top view of the hydraulic system for a carriage in extended mode according to the embodiment of the present invention shown in FIG. 5.

FIG. 6 is a top view of the hydraulic system 500 for a carriage in extended mode according to the embodiment of the present invention shown in FIG. 5. FIG. 6 shows that the hydraulic line 581 extends as the slidable beam 334 slides within the cross beam 320 away from the central beam 310. The hydraulic system 500 slides each slidable beam 334, 338 away from the central beam 310 in unison, while the flexible portion 551 of hydraulic line 581 extends to accommodate the sliding of the T-beam 334. The solid portions 550, 552 retain their size and shape while the flexible portion 551 of hydraulic line 581 extends to a new length.

FIG. 7 is a top view of the hydraulic system 500 for a carriage in extended mode according to one embodiment of the present invention. FIG. 7 shows more detail of hydraulic system 500 of FIG. 5. FIG. 6 shows that hydraulic line 581 comprises four lines having a solid portion 550, a flexible portion 551 and another solid portion 552. Since the slidable T-beam to which the hydraulic line 581 is attached is in extended mode, the solid portions 550, 552 retain their size and shape while the flexible portion 551 of hydraulic line 581 extends or feeds into a new, longer, length. Near the top of the hydraulic line 581 is a clamp apparatus 702 that clamps or encircles the four lines of the hydraulic line 581. The clamp 702 is then coupled to a travel roller 704 that rolls along a track 706, which is coupled to a cross beam, such as cross beam 320 of FIG. 5. The clamp 702 supports weight of the tube lines of the hydraulic line 581.

FIG. 8A shows a side view close up of the travel roller assembly comprising the travel roller 702, the clamp 702 and the track 706. FIG. 8B shows a front view close up of the travel roller assembly. As the top portion 552 of the hydraulic line 581 is slid away from the central beam, such as central beam 310 of FIG. 5, during extension, the clamp 702 and connected travel roller 704 travel along the track 706 so as to carry the weight of the hydraulic line 581. The flexible portion 551 of the hydraulic line 581 bends, as shown in the figure, and pushes upwards with a force that is utilized to hold the travel roller 704 in position on the track 706 so as to control and facilitate movement of the hydraulic line 581.

FIG. 8 is a top view of the hydraulic system 500 for a carriage in retracted mode according to the embodiment of the present invention shown in FIG. 8. Since the slidable T-beam to which the hydraulic line 581 is attached is in retracted mode, the solid portions 550, 552 retain their size and shape while the flexible portion 551 of hydraulic line 581 retracts or coils to a new, shorter, length. As the solid portion 552 of the hydraulic line 581 is slid towards the central beam, such as central beam 310 of FIG. 5, during retraction, the clamp 702 and connected travel roller 704 travel along the track 706 so as to carry the weight of the hydraulic line 581. As explained above, the flexible portion 551 of the hydraulic line 581 bends and pushes outwards with a force that is utilized to hold the travel roller 704 in position on the track 706. This allows for a beam extension of, for example, 30 inches in FIG. 7, and travel of the hydraulic line 581 of, for example, 15 inches, which compacts the hydraulic line 581 for the retracted position in FIG. 8.

Figure 9:
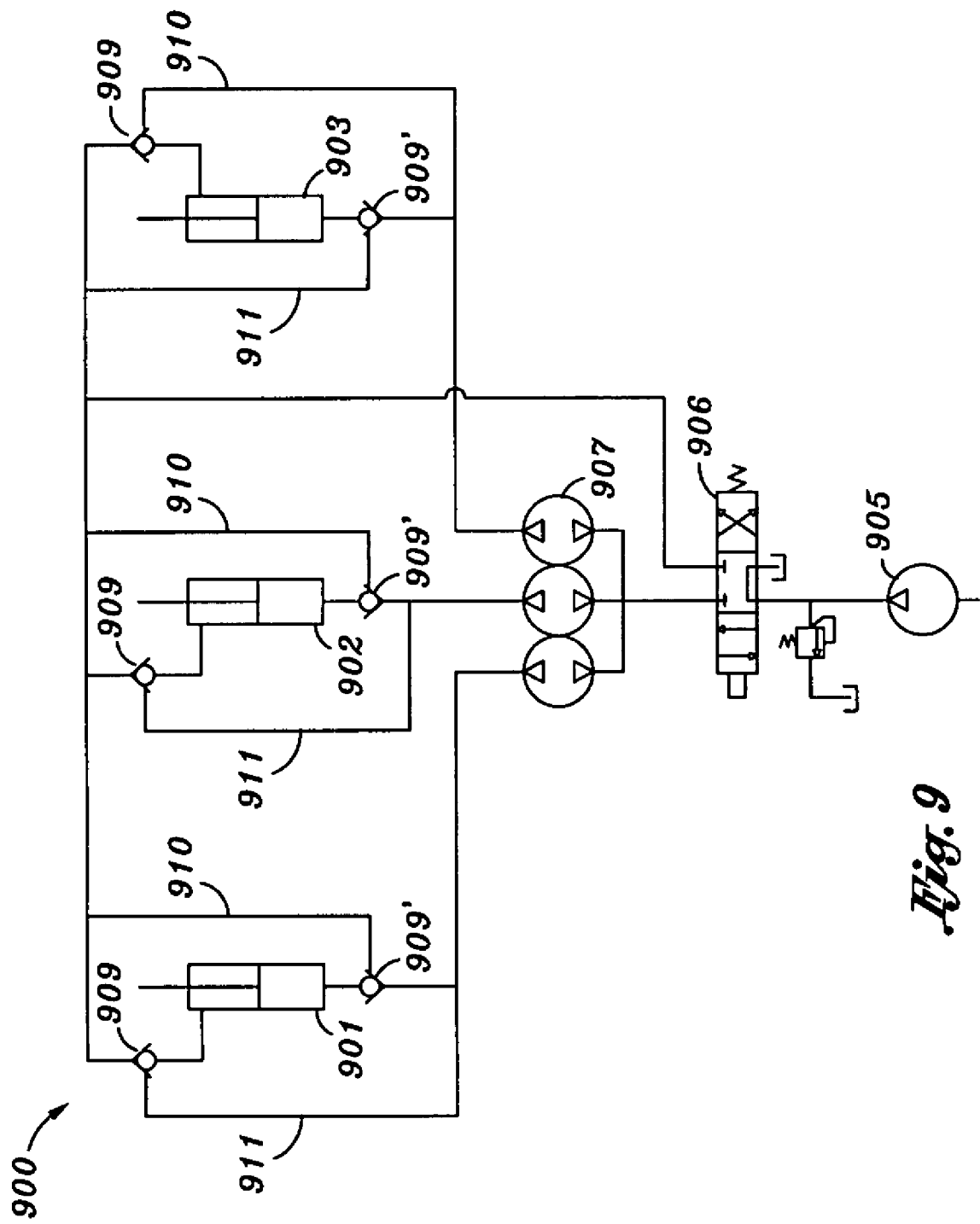
FIG. 9 is a schematic showing a hydraulic sliding system 900 for powering extension and retraction of slidable beams according to one embodiment of the present invention.

FIG. 9 is a schematic showing a hydraulic sliding system 900 for powering extension and retraction of slidable beams according to one embodiment of the present invention. FIG. 9 shows a set of hydraulic cylinders 901, 902 and 903 that may be used to hydraulically slide slidable beams, such as slidable beam 162 of FIG. 1, using the expansion and retraction capabilities of the cylinders. Each cylinder may be located within a cross beam; for example, cylinder 901 may be located within cross beam 120, cylinder 902 may be located within cross beam 122, and cylinder 903 may be located within cross beam 124. A cylinder may be placed within a cross beam longitudinally such that the cylinder extends in the same direction as a cross beam, one end of the cylinder may be coupled with a first slidable beam (such as beam 162) that may be inserted into a first end of the cross beam (such as end 172 of cross beam 120) and the other end of the cylinder may be coupled with a second slidable beam (such as beam 164) that may be inserted into the second end of the cross beam (such as end 174 of cross beam 120). The expansion of a cylinder forces a slidable beam within a cross beam to slide outwards away from the central beam and the retraction of a cylinder forces a slidable beam within a cross beam to slide towards the central beam.

FIG. 9 also shows a pump 905 for maintaining pressure within the hydraulic sliding system 900, a hydraulic valve 906 and a set of rotary flow dividers 907, and pilot check valves 909, 909'. The rotary flow dividers 907 enable extension of all axles in unison such that at any point in the extension all axles are in-line (or of the same width) along the length of the trailer. When extension or retraction is completed, the pilot check valves 909, 909' automatically hydraulically check the hydraulic sliding system 900 to ensure zero movement of a slidable beam. Pilot check valve 909 may be opened using pilot lines 910, 911. Pilot line 910 may provide pressurized oil to pilot check valve 909, opening the pilot check valve 909 and allowing for retraction of cylinders 901, 902, 903. Pilot line 911 may provide pressurized oil to pilot check valve 909', opening the pilot check valve 909' and allowing for extension of cylinders 901, 902, 903.

It should be understood, of course, that the foregoing relates to exemplary embodiments of the invention and that modifications may be made without departing from the spirit and scope of the invention as set forth in the following claims.

We claim:

1. A carriage, comprising:
   a central beam extending the length of the carriage;
   a plurality of cross beams, wherein at least one cross beam comprises:
      a hollow element having a first end and a second end, wherein the hollow element is coupled to and extends perpendicularly to the central beam;
      a first beam slidably positioned within the first end of the hollow element, wherein the first beam is coupled to at least one axle; and
      a second beam slidably positioned within the second end of the hollow element, wherein the second beam is coupled to at least one axle; and
      a hydraulic system coupled to each of the plurality of cross beams for hydraulically sliding each beam positioned within the hollow element,
   wherein the hydraulic system hydraulically slides each beam positioned within each hollow element away from and towards the central beam, and
   wherein the hydraulic system further comprises a hydraulic line coupled to the central beam on one end and a first or second beam of the hollow element on the other end, wherein the hydraulic line extends or contracts when the first or second beam slides within the hollow element.

2. The carriage of claim 1, wherein the central beam includes at least one removable portion.

3. The carriage of claim 1, wherein the plurality of cross beams comprises at least six cross beams.

4. The carriage of claim 1, wherein at least one of the plurality of cross beams is removable.

5. The carriage of claim 1, wherein a hollow element comprises a rectangular shape.

6. The carriage of claim 1, wherein the hydraulic system hydraulically slides each beam positioned within the hollow element away from and towards the central beam in unison such that carriage width is uniform during and after sliding of each beam.

7. The carriage of claim 1, wherein the hydraulic system further comprises a check valve for preventing sliding of each beam positioned within each hollow element.

8. The carriage of claim 1, wherein the hydraulic system further comprises a hydraulic cylinder positioned within each cross beam for hydraulically sliding each beam positioned within the hollow element away from and towards the central beam.

9. A trailer, comprising:
at least one carriage, wherein the at least one carriage comprises:
a central beam extending the length of the at least one carriage;
a plurality of hollow cross beams coupled perpendicularly to the central beam, wherein each cross beam comprises at least one slidable beam positioned within the cross beam, wherein the at least one slidable beam is coupled to at least one axle; and
a hydraulic system coupled to each of the plurality of cross beams for hydraulically sliding the at least one slidable beam positioned within each cross beam, wherein:
the hydraulic system hydraulically slides each slidable beam positioned within each cross beam away from or towards the central beam to vary carriage width;
the hydraulic system hydraulically slides each slidable beam positioned within each cross beam away from and towards the central beam in unison such that carriage width is uniform during and after sliding of each slidable beam; and
the hydraulic system further comprises a hydraulic line coupled to the central beam on one end and the slidable beam on the other end, wherein the hydraulic line extends or contracts when the slidable beam slides within the cross beam.

10. The trailer of claim 9, further comprising at least one additional central beam portion that may be coupled to the central beam.

11. The trailer of claim 9, wherein the plurality of cross beams comprises at least six cross beams.

12. The trailer of claim 9, further comprising at least one additional cross beam portion that may be coupled to the central beam.

13. The trailer of claim 9, wherein the hydraulic system further comprises a check valve for preventing sliding of each slidable beam positioned within each cross beam.

14. The trailer of claim 9, wherein the hydraulic system further comprises a hydraulic cylinder positioned within each cross beam for hydraulically sliding each slidable beam away from or towards the central beam.

15. The trailer of claim 9, wherein the hydraulic system hydraulically slides each slidable beam positioned within each cross beam away from the central beam to a total carriage width of twenty feet and towards the central beam to a total carriage width of fifteen feet.

16. A vehicle for transporting loads, comprising:
a truck for providing locomotion; and
a trailer coupled to the truck via connecting means, the trailer comprising at least one carriage, wherein the at least one carriage comprises:
a central beam extending the length of the carriage;
a plurality of rectangular-shaped slidable beams coupled perpendicularly to the central beam, wherein each slidable beam is coupled to at least one axle; and
a hydraulic system coupled to each of the plurality of slidable beams for hydraulically sliding each slidable beam so as to vary the width of the carriage,
wherein the hydraulic system hydraulically slides each slidable beam away from or towards the central beam, and
wherein the hydraulic system further comprises a hydraulic line coupled to the central beam on one end and a slidable beam on the other end, wherein the hydraulic line extends or contracts when the slidable beam slides.

17. The vehicle of claim 16, wherein the central beam includes at least one removable portion so as to vary length of the carriage.

18. The vehicle of claim 16, wherein the plurality of slidable beams comprises at least six slidable beams.

19. The vehicle of claim 16, wherein the hydraulic system hydraulically slides each slidable beam away from or towards the central beam in unison such that carriage width is uniform during and after sliding of each slidable beam.

20. The vehicle of claim 16, wherein the hydraulic system further comprises a check valve for preventing sliding of each slidable beam.

21. The vehicle of claim 16, wherein the hydraulic system further comprises a hydraulic cylinder positioned within each slidable beam for hydraulically sliding each slidable beam away from or towards the central beam.

* * * * *